(12) United States Patent
McClung, III

(10) Patent No.: US 8,770,292 B2
(45) Date of Patent: Jul. 8, 2014

(54) HEATABLE MATERIAL FOR WELL OPERATIONS

(76) Inventor: Guy L. McClung, III, Rockport, TX (US)

(*) Notice: Subject to any disclaimer, the term of this patent is extended or adjusted under 35 U.S.C. 154(b) by 436 days.

(21) Appl. No.: 13/317,633

(22) Filed: Oct. 24, 2011

(65) Prior Publication Data

US 2012/0097395 A1 Apr. 26, 2012

Related U.S. Application Data

(60) Provisional application No. 61/455,705, filed on Oct. 25, 2010, provisional application No. 61/516,589, filed on Apr. 5, 2011.

(51) Int. Cl.
*E21B 33/13* (2006.01)

(52) U.S. Cl.
USPC ........ 166/288; 166/285; 166/248; 166/272.1; 166/57

(58) Field of Classification Search
CPC ..... E21B 33/14; E21B 33/3316; E21B 36/04; E21B 43/2401
USPC .................. 166/285, 248, 272.1, 302, 57, 288
See application file for complete search history.

(56) References Cited

U.S. PATENT DOCUMENTS

| | | | |
|---|---|---|---|
| 2,075,882 A | 4/1937 | Brantly | |
| 2,169,588 A | 8/1939 | Morrisett | |
| 2,630,179 A | 3/1953 | Brown | |
| 3,448,305 A | 6/1969 | Raynal et al. | |
| 3,583,485 A * | 6/1971 | Woods et al. | 166/288 |
| 4,215,426 A | 7/1980 | Klatt | 367/83 |
| 4,416,000 A | 11/1983 | Scherbatskoy | 367/81 |
| 4,655,286 A | 4/1987 | Wood | 166/285 |
| 4,979,562 A | 12/1990 | Langer | 166/242 |
| 5,202,194 A | 4/1993 | Vanberg, Jr. | 429/13 |
| 5,626,200 A | 5/1997 | Gilbert et al. | 175/40 |
| 5,829,523 A | 11/1998 | North | 166/250.14 |
| 5,965,964 A | 10/1999 | Skinner et al. | 310/15 |
| 5,995,020 A | 11/1999 | Owens et al. | 340/854.9 |
| 6,504,258 B2 | 1/2003 | Schultz et al. | 290/1 R |
| 6,554,074 B2 | 4/2003 | Longbottom | 166/372 |
| 6,672,382 B2 | 1/2004 | Schultz et al. | 166/65.1 |
| 6,672,409 B1 | 1/2004 | Dock et al. | 175/107 |
| 6,717,283 B2 | 4/2004 | Skinner et al. | 290/43 |
| 7,002,261 B2 | 2/2006 | Cousins | 290/54 |
| 7,133,325 B2 | 11/2006 | Kotsonis et al. | 367/83 |
| 7,156,172 B2 * | 1/2007 | Becker et al. | 166/288 |
| 7,242,103 B2 | 7/2007 | Tips | 290/1 R |
| 7,472,753 B2 | 1/2009 | Mondelli et al. | 166/291 |
| 7,699,102 B2 | 4/2010 | Storm et al. | 166/244.1 |
| 7,814,993 B2 | 10/2010 | White | 175/93 |
| 8,020,621 B2 | 9/2011 | DiFoggio et al. | 166/302 |
| 8,047,282 B2 | 11/2011 | Lewis et al. | 166/249 |
| 8,080,199 B2 | 12/2011 | Tour et al. | 264/494 |
| 8,168,570 B2 | 5/2012 | Barron et al. | 507/269 |
| 2008/0296023 A1* | 12/2008 | Willauer | 166/302 |

* cited by examiner

Primary Examiner — Cathleen Hutchins
(74) Attorney, Agent, or Firm — Guy McClung

(57) ABSTRACT

Heatable wellbore material, e.g., cements, polymers, composites, and epoxies, and systems and methods using heatable material, which, in certain aspects, are methods for cementing casing in a wellbore with such cement, the heatable material, in some aspects, being one or a combination of electrically resistively heatable material, microwave heatable material, and/or material heatable by the application thereto of a magnetic field.

8 Claims, 8 Drawing Sheets

HEATABLE MATERIAL FOR WELL OPERATIONS

CROSS REFERENCE TO RELATED APPLICATIONS

The present invention and application claim, under the U.S. Patent Laws, the benefit of priority from pending U.S. Application Ser. Nos. 61/455,705 filed Oct. 25, 2010 and 61/516,589 filed Apr. 5, 2011, both said applications incorporated fully herein for all purposes.

BACKGROUND OF THE INVENTION

1. Field of the Invention

The present invention is directed to: wellbore operations; wellbore cement; wellbore cementing methods; methods for casing a well; methods for producing a well; such methods employing heatable cement; such methods having cement with resistively heatable electrically conductive material and/or inductively heatable material and/or microwave heatable material; in certain particular aspects, to providing a wellbore with a casing string having all or a portion thereof cemented with cement having electrically conductive nanomaterial therein that is heatable by imposing an electric current thereon thereby heating the cement; and to methods for wellbore operations using material (e.g., cements, polymers, composites, and/or epoxy systems) having resistively heatable electrically conductive material and/or inductively heatable material and/or microwave heatable material to facilitate heating, hardening, setting, and/or curing.

2. Description of Related Art

There are a multitude of known systems and methods for completing a wellbore for oil and gas production, including many known casing methods and methods for cementing casing in a wellbore. There are many known cements used in such systems and methods.

FIG. 1 shows schematically and not to scale a typical cased wellbore with casing cemented in place in the wellbore with cement. The casing extends from an earth surface down to the bottom of the wellbore and the casing is usually cemented along its length.

There have long been needs, recognized by the present inventor, for heatable cement for wellbore operations, for effective well completion methods and systems, and for enhanced methods and systems for producing fluids from a wellbore.

SUMMARY OF THE PRESENT INVENTION

The present invention discloses cements and methods for using such cements. In certain aspect, using such cements for cementing casing in a wellbore, the methods including cementing at least a portion of a casing in a wellbore with cement that contains one or a combination of: resistively heatable electrically conductive material; inductively heatable material; microwave heatable material; and/or electrically conductive nanomaterial.

The present invention discloses cements and methods for using such cements for cementing casing in a wellbore, the methods including cementing at least a portion of a casing in a wellbore with cement that contains electrically conductive nanomaterial. In certain aspects, the present invention discloses materials, systems, and methods for facilitating the hardening, setting, and/or curing of material within a wellbore (e.g., but not limited to, polymers, composites, epoxy systems, and cements) and/or within a wellbore structure (downhole or above ground) by employing material that contains one or a combination of: resistively heatable electrically conductive material; inductively heatable material; microwave heatable material; and/or electrically conductive nanomaterial.

The present invention, in certain aspects, discloses a cased cemented wellbore and methods for making such a wellbore that has at least a part of, parts of, or all of the cement containing electrically conductive nanomaterial therein so that part, parts, or all of the cement is heatable by imposing an electric current on the electrically conductive nanomaterial resulting in resistive heating of the cement, and, if desired, things in contact with or near the cement. The current may be either alternating current or direct current. Such heating may also facilitate curing, solidifying, and/or setting of the cement. In one aspect, material (e.g., cement, polymer, composite, epoxy system) according to the present invention has nanomaterials therein which are electrically conductive, for example, and not limited to, electrically conductive nanotubes, nanographene, nanographene ribbons, and/or transformed nanomaterials and carbon nanomaterials, e.g., but not limited to, carbon nanotubes. Electrically conductive nanomaterial in embodiments of the present invention may include one or a variety of nanotubes, including, but not limited to single-walled nanotubes, multi-walled nanotubes, double walled nanotubes, and/or surface-modified nanotubes. "Nanomaterial" includes, without limitation, one, some or any combination of these materials and/or nanotubes.

It is within the scope of the present invention to impose a magnetic field on inductively hetable material, to impose an electric current on electrically conductive material, and/or to impose an electrical current on electrically conductive nanomaterial in material (e.g., in cement, polymer, epoxy system) according to the present invention using any suitable magnetic field generator, induction coil apparatus, and/or power system and/or control system and/or connectors, connections, leads, metal tubulars themselves, wires and/or power cables, insulated or not, in the earth adjacent the material, in the material, on the exterior of a tubular and/or on the interior of a tubular. Optionally, electric current is sent via a transmitted wave or signal (with a wired system and/or wirelessly) to a suitable receptor for conversion to electrical current for application to the material. Optionally, a generator in the earth, in the wellbore, or in a tubular in the wellbore generates the needed electricity to produce heat.

Heat generated in material (e.g., in cement, in polymers, in an epoxy system) according to the present invention and/or in systems according to the present invention can be used to heat the material and, in certain aspects, to heat things and materials either in contact with the material or in proximity to the material; e.g., but not limited to, tubulars (e.g., casing, collars, pipe, or tubing), fluid and/or materials in such tubular, fluid and/or materials outside a tubular, e.g. fluid or materials in an annulus between a tubular exterior and a wellbore or tubular exterior, and earth or formations adjacent the material; e.g., but not limited to, adjacent cement in a wellbore.

Accordingly, the present invention includes features and advantages which are believed to enable it to advance wellbore technology and wellbore production technology. Characteristics and advantages of the present invention described above and additional features and benefits will be readily apparent to those skilled in the art upon consideration of the following description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions of embodiments preferred at the time of filing for this patent that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain embodiments of the invention, other objects and purposes will be readily apparent to one of skill in this art who has the benefit of this invention's teachings and disclosures. It is, therefore, an object of at least certain embodiments of the present invention to provide the embodiments and aspects listed above and:

New, useful, unique, efficient, nonobvious systems and methods for completing a wellbore for fluid production therefrom;

New, useful, unique, efficient, nonobvious wellbore casing cements which include inductively heatable material, electrically conductive material, and/or electrically conductive nanomaterial therein to heat the cement and, in some aspects, material and/or earth in contact with and/or adjacent the heated cement;

New, useful, unique, efficient, nonobvious wellbore cements and systems and methods for cementing casing in a wellbore; and New, useful, unique, efficient, nonobvious systems and methods for heating all, a part of, or parts of cement that cements casing in a wellbore.

New, useful, unique, efficient, nonobvious wellbore materials which include inductively heatable material, electrically conductive material, microwave heatable material, and/or electrically conductive nanomaterial therein to heat the wellbore material (e.g., cement, polymers, composites, epoxy systems, e.g., but not limited to, two-part epoxy systems) and, in some aspects, material and/or earth in contact with and/or adjacent the heated material; and New, useful, unique, efficient, nonobvious systems and methods for heating all, a part of, or parts of material in a wellbore e.g, but not limited to, cement that cements casing in a wellbore.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly, from a cursory inspection or review. the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate embodiments preferred at the time of filing for this patent and are not to be used to improperly limit the scope of the invention which may have other equally effective or legally equivalent embodiments.

Figure 1:
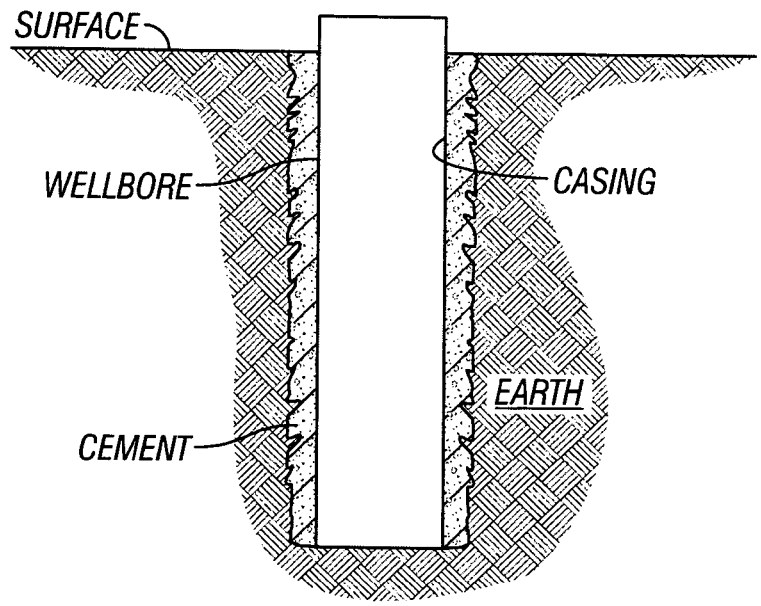
FIG. 1 is a schematic view—not to scale—of a prior art cased cemented wellbore.

Certain embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of certain embodiments and are not intended to limit the invention or the appended claims. On the contrary, the intention is to cover all modifications, equivalents and alternatives falling within the spirit and scope of the invention as defined by the appended claims. In showing and describing these embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein. The drawing figures present the embodiments preferred at the time of filing for this patent.

DETAILED DESCRIPTION OF THE INVENTION

It is within the scope of the present invention, in any embodiment described below, to substitute for the electrically conductive nanomaterial, electrically conductive material that is sufficiently resistively heatable to effect the desired heating and/or microwave heatable material. It is within the scope of the present invention, in any embodiment described below, to substitute for the electrically conductive nanomaterial, inductively heatable material that is sufficiently inductively heatable to effect the desired heating and/or microwave heatable material; and in such embodiments, any power source below may be changed to a magnetic field apparatus useful in inductive heating, e.g., but not limited to, induction coil apparatuses and/or changed to a suitable apparatus for applying microwaves to microwave heatable material. It should also be understood that it is within the scope of the present invention to use a combination of any of these materials—electrically conductive material, inductively heatable material, microwave heatable material, and electrically conductive nanomaterial—in a single material in or for introduction into a wellbore, e.g., but not limited to, cements, polymers, ckomposites, and/or epoxy systems, including, but not limited to, two-part epoxy systems and, in certain particular aspects, in a single cement or in a single zone of a wellbore.

Figure 2:
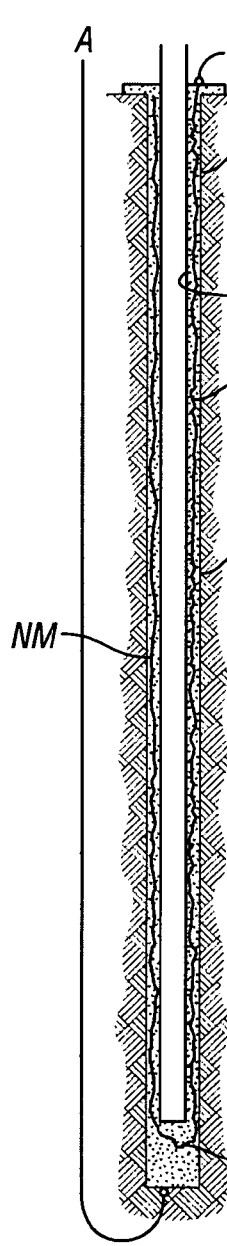
FIG. 2 is a schematic view—not to scale—of a cased cemented wellbore according to the present invention.

FIG. 2 shows a cemented cased wellbore Q with electrically conductive nanomaterial NM (e.g., but not limited to, carbon nanotubes) throughout the cement. Electricity is imposed on the nanomaterial in the cement via leads A and B. As is true for any embodiment described below, the material NM may be replaced by, or used with, one or a combination of (combinations including any two or three of these materials or a combination of any one or two of them with electrically conductive nanomaterial) resistively heatable electrically conductive material; inductively heatable material; microwave heatable material. "Microwave heatable material" as used herein may include any of the nanomaterials disclosed or referred to herein that is microwave heatable.

Figure 3:
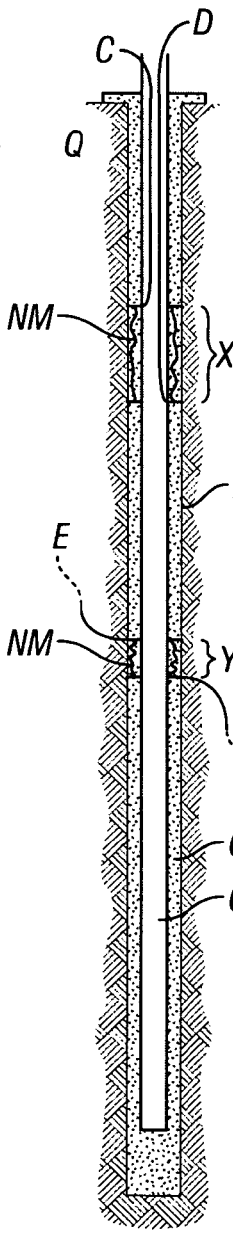
FIG. 3 is a schematic view—not to scale—of a cased cemented wellbore according to the present invention.

FIG. 3 shows a cemented cased wellbore R with electrically conductive nanomaterial NM (e.g., but not limited to, carbon nanotubes) in discrete portions X and Y of the cement. Electricity is imposed on the cement portion X via leads C and D and/or the cement portion Y by leads E and F (all leads going to a power source either in the well or at the surface).

It is within the scope of the present invention to have any number of spaced-apart portions of cement in a wellbore (e.g., one, two, three, four or multiple portions throughout a wellbore or multiple spaced-apart portions in an area of a wellbore adjacent a particular formation) with electrically conductive nanomaterial therein so that any part of the wellbore and of adjacent formation can be selectively heated.

Figure 4:
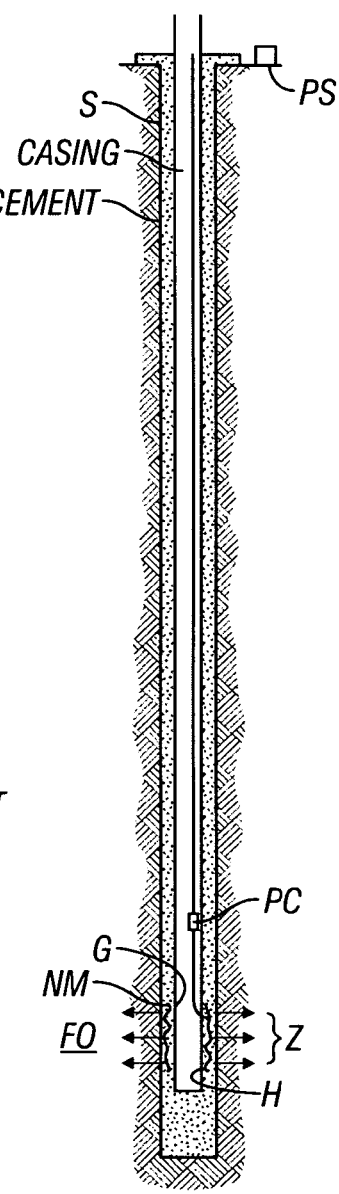
FIG. 4 is a schematic view—not to scale—of a cased cemented wellbore according to the present invention.

FIG. 4 shows a perforated zone Z in a cased cemented wellbore S with electrically conductive nanomaterial NM in the cement adjacent the perforated zone. This part of the cement in the zone Z can be selectively heated via leads G and H with a power source PS at the surface or with a power source PC in the well, or with both. Any suitable AC or DC power source or sources may be used (as is true for any embodiment according to the present invention). It is believed that heating the formation FO around the zone Z may, in some cases, facilitate production from the formation. As is true for any embodiment of the present invention (including, but not limited to, those described above and below) instead of or in addition to the power source PS, depending on the material to be heated, a magnetic field apparatus may be used and/or an apparatus for applying microwaves to microwave heatable material may be used and the subject matter of the various drawing figures that shows a power source may be changed so that the power source is deleted and a magnetic filed source and/or microwave source is used.

Figure 5A:
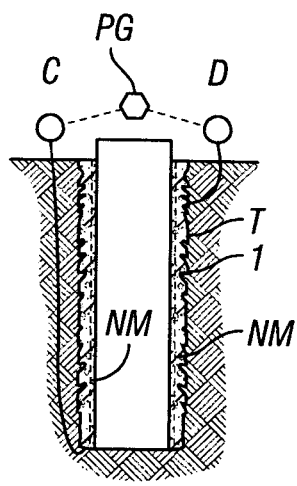
FIG. 5A is a schematic view—not to scale—of a cased cemented wellbore according to the present invention.

FIG. 5A shows a cased cemented wellbore 1 with electrically conductive nanomaterial NM (not to scale) in cement T with one lead C at the bottom of the cement and extending up through the earth and one lead D extending through the earth to an upper part of the cement.

Figure 5B:
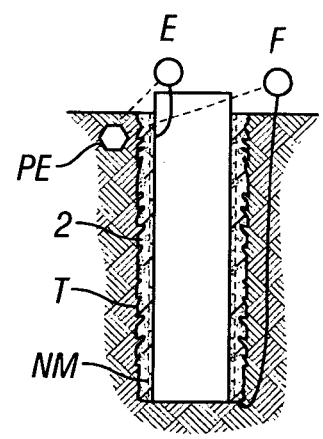
FIG. 5B is a schematic view—not to scale—of a cased cemented wellbore according to the present invention.

FIG. 5B shows a cased cemented wellbore 2 with electrically conductive nanomaterial NM (not to scale) in cement T with one lead E at the top of the cement and connected to the interior of the casing and one lead F extending through the earth to the bottom of the cement T. The lead E may be insulated and may pass through the casing to contact the cement.

Figure 5C:
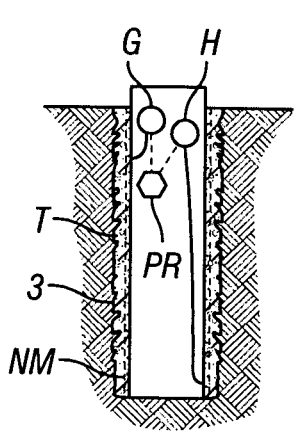
FIG. 5C is a schematic view—not to scale—of a cased cemented wellbore according to the present invention.

FIG. 5C shows a cased cemented wellbore 3 with electrically conductive nanomaterial NM (not to scale) in cement T with one lead G at the top of the cement and connected to the interior of the casing and one lead H extending through the casing's interior to the bottom of the cement T. The leads may contact the casing itself or the leads may be insulated and may pass through the casing to contact the cement.

Figure 5D:
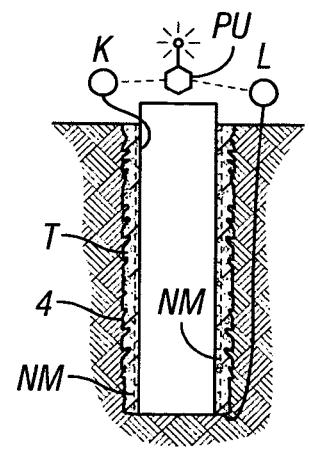
FIG. 5D is a schematic view—not to scale—of a cased cemented wellbore according to the present invention.

FIG. 5D shows a cased cemented wellbore 4 with electrically conductive nanomaterial NM (not to scale) in cement T with one lead K at the top of the cement and passing through or connected to the interior of the casing and one lead L extending through the earth to the bottom of the cement T. The lead K may contact the casing itself or the lead K may be insulated and may pass through the casing to contact the cement.

Power may be supplied to the leads of the systems of FIGS. 5A-5D via a surface power generator PG (see e.g. FIG. 5A) or via a power generator PE in the earth (see FIG. 5B), or via a power generator PR within the casing (see FIG. 5C). Optionally, a power source PU either at the surface, as shown, or in the casing or in the earth (not shown) receives a wave or signal from an appropriate device or system and converts the wave or signal to electric power for application to the leads K and L. Power may be supplied to any system or cement according to the present invention with any of the power sources of FIGS. 5A-5D. When inductively heatable material is used instead or in addition to cement, a magnetic field is applied the inductively heatable material via a surface apparatus or via an apparatus in the earth, or via an apparatus within the casing. Optionally, such an apparatus either at the surface or in the casing or in the earth receives a wave or signal from an appropriate device or system and converts the wave or signal to power for application of the magnetic field. When microwave heatable material is used instead of or in addition to cement and/or inductively heatable material, microwaves are applied the inductively heatable material via a surface apparatus or via an apparatus in the earth, or via an apparatus within the casing. Optionally, such an apparatus either at the surface or in the casing or in the earth receives a wave or signal from an appropriate device or system and converts the wave or signal to power for application of the microwaves.

As is true of any wellbore, any system and any method according to the present invention, a cased wellbore according to the present invention, as exemplified by the wellbores in the drawing figures hereof, can be made with any known drilling and completion method that involves the cementing of casing in a wellbore, including, but not limited to, typical drilling and cementing operations and also, without limitation, casing drilling methods, rotary drilling methods, top drive drilling methods and coiled tubing drilling methods.

Figure 6:
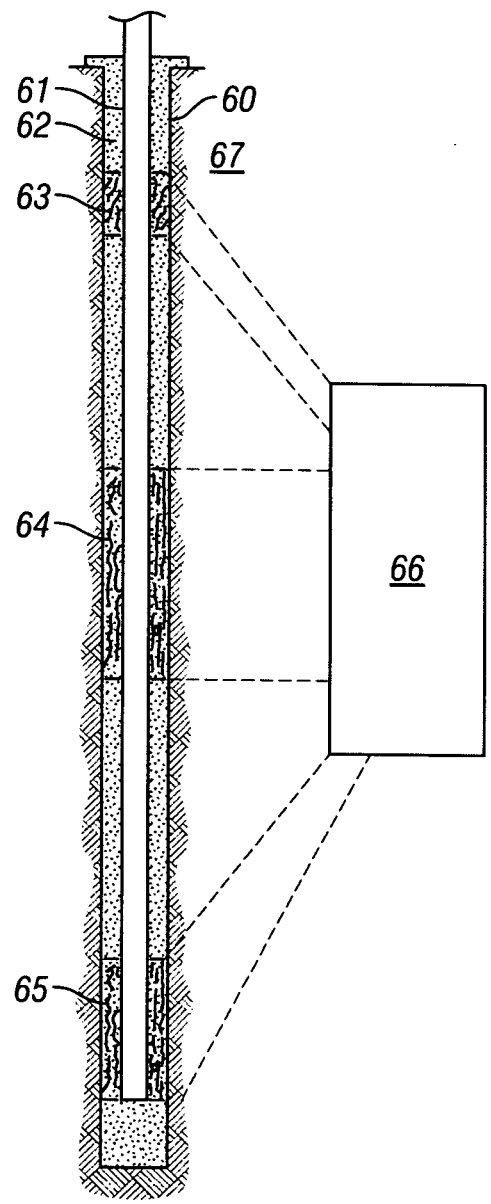
FIG. 6 is a schematic view—not to scale—of a cased cemented wellbore according to the present invention.

FIG. 6 shows a wellbore 60 according to the present invention in the earth 67. Casing 61 is cemented in the wellbore 60 with cement 62. Portions 63, 64 and 65 of the cement 62 have electrically conductive nanomaterial NM therein. The portions 63, 64, 65 are spaced-apart any desirable distance and they may be located adjacent different earth formations. There may be the three portions shown or, according to the present invention, there may be two or any number of such portions at any part of or throughout the wellbore.

A power supply 66 supplies electrical current to the nanomaterial NM in the portions 63, 64, 65. All portions can be heated simultaneously; one or two portions may be selectively heated; or the portions may be sequentially heated from top to bottom or from bottom to top.

Figure 7:
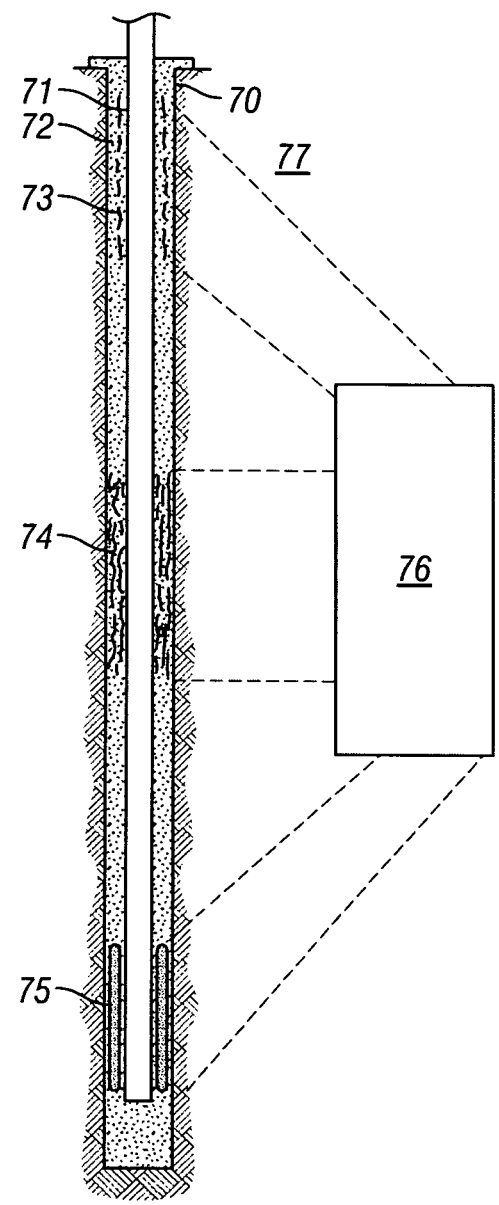
FIG. 7 is a schematic view—not to scale—of a cased cemented wellbore according to the present invention.

FIG. 7 shows a wellbore 70 according to the present invention in the earth 77. Casing 71 is cemented in the wellbore 70 with cement 72. Portions 73, 74 and 75 of the cement 72 have electrically conductive nanomaterial NM therein. The portions 73, 74, 75 are spaced-apart any desirable distance and they may be located adjacent different earth formations. There may be the three portions shown or, according to the present invention, there may be two or any number of such portions at any part of or throughout the wellbore.

A power supply 76 (within the earth as shown or at the surface or within the wellbore—as is true for the power supply 66) supplies electrical current to the nanomaterial NM in the portions 73, 74, 75. All portions can be heated simultaneously; one or two portions may be selectively heated; or the portions may be sequentially heated from top to bottom or from bottom to top.

As shown in FIG. 7, the density (or concentration) of nanomaterial NM in the portion 73 is less than the density of nanomaterial NM in the portion 74; and the density of nanomaterial NM in the portion 75 is denser than that of the nanomaterial NM in the portion 74. In one aspect, it is possible to heat the portion 75 faster than the portions 74 and 73 due to the presence of more nanomaterial per unit volume in the portion 75; and/or it is possible to heat the portion 75 to a higher temperature than the other two portions for the same reason. It is to be understood that heating of the portions 63-65 and/or 73-75, can, according to the present invention, be used to heat the earth in contact with or adjacent these portions and/or to heat the casing adjacent these portions and/or the contents of the casing adjacent these portions.

The power supplies 66 and 76 and the leads, cables, connections, etc. for them may be any power source or supply and leads, etc. disclosed herein. Any control system may be used with the power supplies 66 and 76, e.g. like the control system CS FIG. 10A or any of the options disclosed for the system CS.

The present invention provides improvements to various existing wellbore cementing methods. In one aspect, the present invention provides methods which in some ways are similar to those disclosed in U.S. Pat. No. 5,829,523, incorporated fully herein for all purposes. In certain embodiments of the present invention, in cementing casing or liners (both referred to hereinafter as "casing") in well bores (sometimes referred to as "primary cementing"), a cement slurry containing electrically conductive nanomaterial is pumped downwardly through the casing to be cemented and then upwardly into the annulus between the casing and the walls of the well bore. Upon setting, the cement bonds the casing to the walls of the well bore and restricts fluid movement between formations or zones penetrated by the well bore. Prior to this, the casing is suspended in a well bore and both the casing and the well bore are filled with drilling fluid. In order to reduce contamination of the cement slurry at the interface between it and the drilling fluid, a cementing plug for sealingly engaging the inner surfaces of the casing is pumped ahead of the cement slurry whereby the cement slurry is separated from the drilling fluid as the cement slurry and drilling fluid ahead of it are displaced through the casing. The cementing plug wipes the drilling fluid from the walls of the casing and maintains a separation between the cement slurry and drilling fluid until the plug lands on a float collar attached near the bottom end of the casing.

The cementing plug which precedes the cement slurry and separates it from drilling fluid is referred to herein as the "bottom plug." When the predetermined required quantity of the cement slurry has been pumped into the casing, a second cementing plug, referred to herein as the "top plug", is released into the casing to separate the cement slurry from additional drilling fluid or other displacement fluid used to displace the cement slurry. When the bottom plug lands on the float collar attached to the casing, a valve mechanism opens which allows the cement slurry to proceed through the plug and the float collar upwardly into the annular space between the casing and the well bore. The design of the top plug is such that when it lands on the bottom plug it shuts off fluid flow through the cementing plugs which prevents the displacement fluid from entering the annulus. After the top plug lands, the pumping of the displacement fluid into the casing is continued whereby the casing is pressured up and the casing and associated equipment including the pump are pressure tested for leaks or other defects.

The present invention provides, in certain aspects, methods which include releasing a first displacement plug (e.g., but not limited to, as in U.S. Pat. No. 5,829,523) into the casing which is selectively openable after landing on a float collar. A first displacement fluid is then pumped behind the first displacement plug while measuring the quantity of the first displacement fluid being pumped until the first displacement plug is displaced through the casing and lands on a float shoe contained in the casing. The first displacement plug is caused to open, and a cement slurry which has nanomaterials therein (any cement according to the present invention) is pumped into the casing in a predetermined quantity required to fill the annulus between the exterior of the casing and the walls of the well bore with the cement slurry. After the predetermined quantity of cement slurry is pumped into the casing, a top cementing plug is released into the casing. A second displacement fluid is then pumped behind the top cementing plug to displace the cement slurry through the casing and through the open displacement plug into the annulus. The second displacement fluid is pumped in a quantity substantially equal to the quantity of the first displacement fluid as measured during the displacement of the first displacement plug thereby ensuring that the cement slurry is not under or over displaced in the annulus.

As shown in FIGS. 8A-8D, a well cementing plug assembly (any known suitable assembly, e.g., but not limited to, as shown in U.S. Pat. No. 5,829,523) is illustrated and generally designated by the numeral 810. The plug assembly 810 is shown positioned within a string of casing 812 which is suspended in a well bore 814 preparatory to being cemented therein. The plug assembly 810 is in its initial position in the casing 812 whereby it is releasably connected to the lower end of a string of drill pipe or a conventional circulation tool 816. The casing 812 includes a conventional float collar 824 connected therein near the bottom thereof. A conventional float shoe 832 is connected to the bottom end of the casing 812 separated from the float collar 824 by a distance 830.

In one version of a cementing plug assembly 810, the assembly has a selectively operable displacement plug 818 which is releasably connected to a selectively operable bottom cementing plug 820. The bottom cementing plug 20 is in turn releasably connected to a top cementing plug 822. The top cementing plug 822 is releasably connected to the drill pipe or circulation tool 816.

The displacement plug 818 and bottom cementing plug 820 are both separately closed and released by dropping different sizes of releasing plugs, e.g., balls, therein and then increasing the differential fluid pressures exerted on the plugs to predetermined differential fluid pressures which cause their release as will be described further herein below. When the displacement plug 818 lands on the float shoe 824 and when the bottom plug 820 lands on the displacement plug 818, the plugs are separately caused to open. That is, the displacement and bottom plugs are opened by again increasing the differential fluid pressures exerted on them to predetermined differential fluid pressures. The top cementing plug 822 is also closed and released by dropping a releasing plug, e.g., a drill string or tubing plug, therein and exerting a predetermined differential fluid pressure thereon.

Figures 8A, 8B, 8C, 8D:
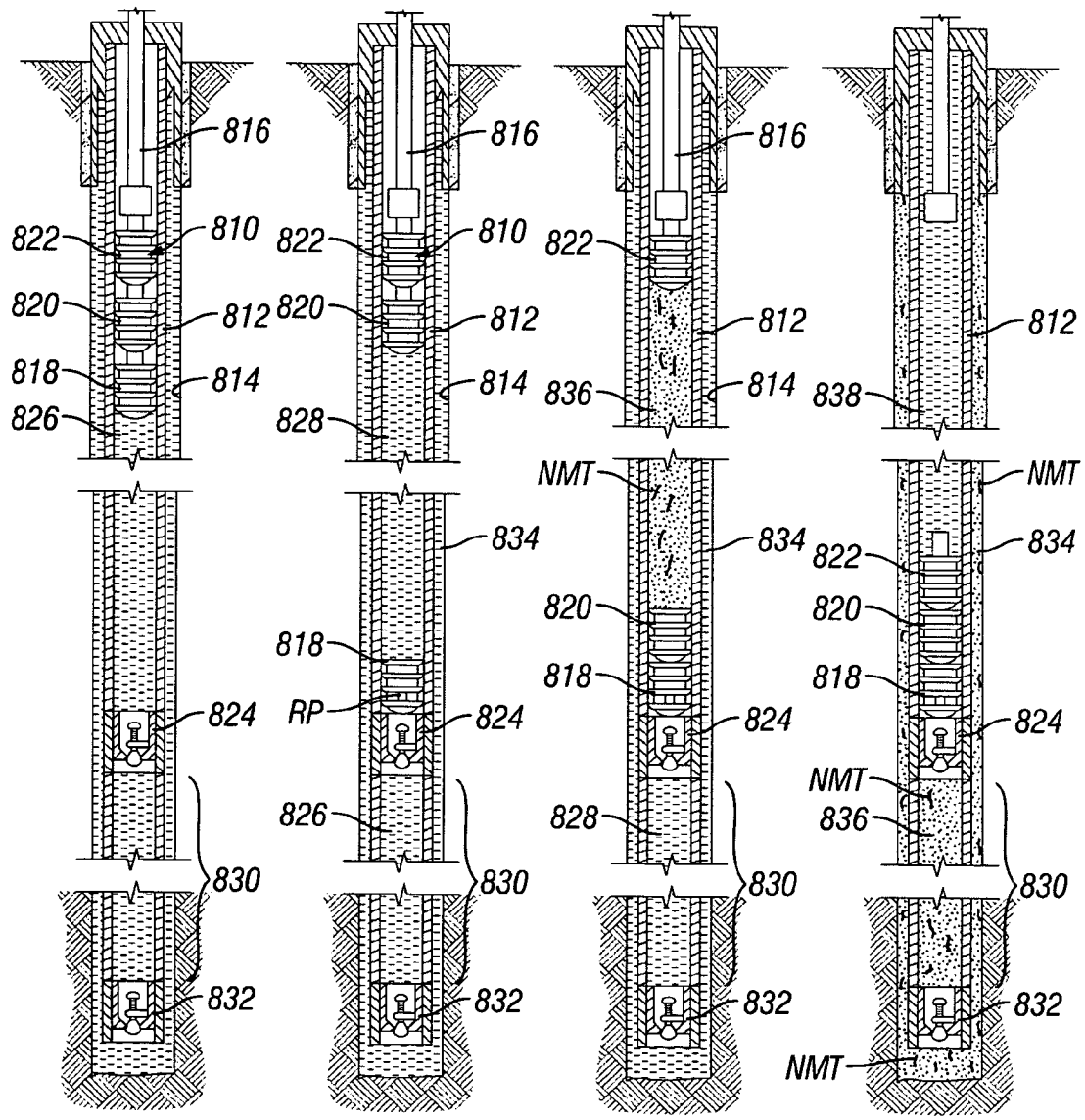
FIG. 8A is a side cross-sectional view of a well bore and a casing to be cemented therein having a cementing plug assembly installed in its initial position in the casing.
FIG. 8B is a view similar to FIG. 8A, but showing the well bore and casing after a displacement plug of the cementing plug assembly has been released and landed on a float collar in the casing.
FIG. 8C is a view similar to FIG. 8B, but showing the well bore and casing after a bottom plug of the cementing plug assembly has been released and landed on the displacement plug.
FIG. 8D is a view similar to FIG. 8C, but showing the well bore and casing after a top plug of the cementing plug assembly has been released and landed on the bottom plug.

Both the casing 812 to be cemented and the well bore 814 are usually filled with drilling fluid prior to commencing primary cementing operations. After suspending the casing string 812 in the well bore 814 and positioning the cementing plug assembly 810 within the casing 812 as shown in FIG. 8A, a releasing plug RP of a predetermined relatively small size is dropped into and caused to be moved in a known manner through the drill string or circulation tool 816, through the plug assembly 810 and into the displacement plug 818. The releasing plug closes the displacement plug 818 and a first predetermined differential fluid pressure is then exerted on the displacement plug 818 which causes its release from the assembly 810. A first displacement fluid, such as drilling fluid, is pumped behind the closed displacement plug so that the displacement plug is moved through the casing and lands on the float collar 824 as shown in FIG. 8B. The displacement plug 818 slidably and sealingly engages the walls of the casing 812 as it is moved through the casing and it separates and prevents mixing of the fluids on its opposite sides, i.e., drilling fluid 826 below the displacement plug 818 which was in the casing prior to the release of the displacement plug 818 and the first displacement fluid 828 above the displacement plug 818. Optionally, as the displacement plug 818 is moved through the casing 812, the quantity of the first displacement fluid being pumped is measured by a volume meter, a pump stroke counter or other volume measurement device whereby when the displacement plug 818 lands on the float collar 824, the total quantity of displacement fluid required to move the displacement plug 818 from the assembly 810 to the float shoe is known.

When the displacement plug 818 lands on the float collar 824, the movement of the displacement plug 818 and the flow of the first displacement fluid is stopped whereby the pressure within the casing 812 above the displacement plug 818 is increased. Such pressure increase is seen in the displacement fluid pressure indicated at the surface whereby the drilling rig operator knows the displacement plug 818 has landed and can then observe or otherwise determine the total quantity of the first displacement fluid pumped. Thereafter, the first displacement fluid pressure is increased by continued pumping until a second predetermined differential fluid pressure is reached which opens the displacement plug 818 in a manner which will be described herein below.

A length 830 of the casing 812 extends between the float collar 824 and the float shoe 832 attached to the bottom end of the casing 812. The length of casing 830 between the float collar 824 and the float shoe 832 is known in the art as the shoe track and will be referred to hereinafter as the shoe track 830. During the travel of the displacement plug 818 from the assembly 810 to the float collar 824, the drilling fluid 826 below the displacement plug 818 is displaced through the float collar 824, through the shoe track 830 and through the float shoe 832 into the annulus 834 between the casing 812 and the walls of the well bore 814. Once the displacement plug 818 has landed on the float collar 824, the total quantity of the first displacement fluid pumped has been measured and the displacement plug 818 has been opened, a second releasing plug of a predetermined medium size as compared to the first releasing plug is dropped into the bottom cementing plug 820 whereby the bottom cementing plug 820 is closed. A cement slurry 836 is then pumped through the drill string or circulation tool 816 whereby a third predetermined differential fluid pressure is exerted on the bottom cementing plug 820 and it is released. The cement slurry contains electrically conductive nanomaterial NMT (not shown to scale; any such nanomaterial disclosed herein according to the present invention). The cement slurry 836 is pumped into the casing 812 behind the bottom plug 820 in a predetermined quantity required to fill the annulus 834. As the bottom plug 820 moves through the casing 812, the first displacement fluid 828 is displaced through the displacement plug 818, through the float collar 824, through the shoe track 830, through the float shoe 32 and into the annulus 834. The cement slurry 836 is pumped, and if necessary displaced, into the casing 812 until the bottom plug 820 lands on the displacement plug 818 as shown in FIG. 8C. The pumping or displacement of the cement slurry 836 is then continued to increase the fluid pressure exerted on the bottom cementing plug 820 until a fourth predetermined differential fluid pressure is reached which causes the bottom cementing plug 820 to open and the cement slurry 836 to flow through it, through the displacement plug 818, through the float collar 824, through the shoe track 830, through the float shoe 832 and into the annulus 834.

When the predetermined quantity of cement slurry 836 has been pumped into the casing 812, a third releasing plug of a predetermined large size as compared to the second releasing plug is dropped into the top cementing plug 822 which closes the top cementing plug 822. A second displacement fluid 838, which preferably is the same as or at least has very similar properties to the first displacement fluid 828 used, is pumped behind the top cementing plug 822. The fluid pressure exerted on the top cementing plug 822 by the second displacement fluid 838 is increased to a fifth predetermined differential fluid pressure which causes the top cementing plug 822 to be released. Thereafter, a quantity of the second displacement fluid 838 substantially equal to the previously measured quantity of the first displacement fluid 828 is pumped. The pumped quantity of the second displacement fluid 838 is preferably measured using the same flow meter or other measuring device which was used to measure the quantity of the first displacement fluid thereby assuring that the two quantities are the same or substantially the same.

The cement slurry 836 is displaced through the casing 812, through the bottom cementing plug 820, through the displacement plug 818, through the float collar 824, through the shoe track 830 and through the float shoe 832 into the annulus 834 as shown in FIG. 8D. When the top cementing plug 822 lands on the bottom cementing plug 820, the top cementing plug terminates the flow of the second displacement fluid 838 and prevents it from flowing into the shoe track 830 or the annulus 834. The pumping of the measured quantity of the second displacement fluid 838 allows the rig operator to know that the top plug 822 has landed whereupon the operator can proceed to pressure test the casing 812 and associated equipment. The cement slurry 836 in the annulus 834 and the shoe track 830 is then allowed to set whereby the casing 812 and shoe track 30 are cemented in the well bore. Thereafter, the displacement plug 818, the cementing plugs 820 and 822, the internals of and set cement in float collar 824, the set cement in the shoe track 830 and the internals of and set cement in the float shoe 832 are all drilled out of the casing 812 whereupon the well is completed or additional well bore is drilled below the casing 812.

In accordance with certain aspects of the present invention, the quantity of the second displacement fluid 838 utilized for displacing the top cementing plug 822 and the cement slurry 836 through the casing 812 and into the annulus 834 is a quantity substantially equal to the quantity of the first displacement fluid 828 measured when the displacement plug 818 was displaced through the casing 812 with the first displacement fluid 828. The first and second displacement fluids are preferably the same or very similar fluids, e.g., drilling fluid, and are preferably measured by the same flow meter or other measuring device to ensure as much as possible that the quantities of the first and second displacement fluids are equal or at least substantially equal. Thus, the quantity of the second displacement fluid 838 required to displace the cement slurry 836 into the annulus 834 and land the top cementing plug 822 is positively determined.

It is within the scope of the present invention that some operators may prefer to omit the use of the bottom cementing plug 820, and instead utilize a two plug assembly consisting of the displacement plug 818 and the top cementing plug 820. Also it is within the scope of the present invention that the displacement plug and one or two cementing plugs used be released from the surface separately in any suitable manner and do not necessarily need to be releasably connected in an assembly as described above.

A wellbore made as in FIGS. 8A-8D may have any device or system described herein for imposing a current on the nanomaterial in the cement.

Figure 9C:
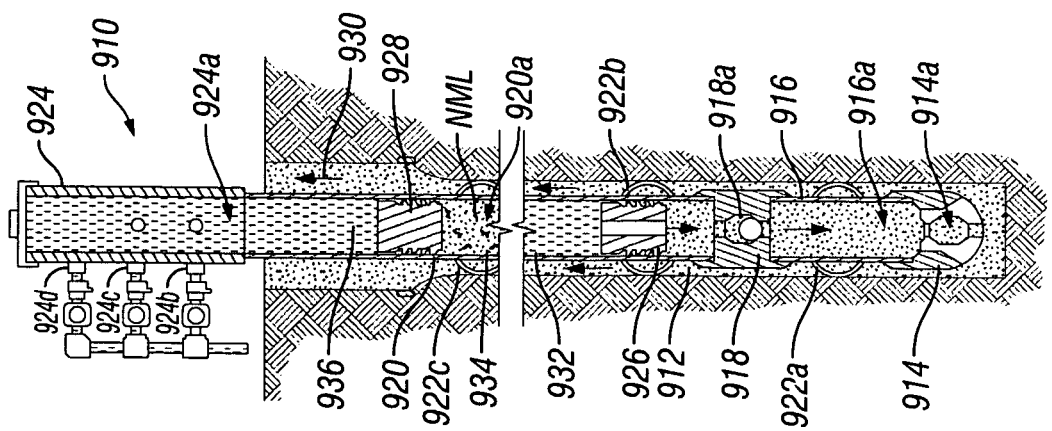
FIG. 9C is a fragmentary cross-sectional illustration of an embodiment of a step in a method according to the present invention.
Figure 9B:
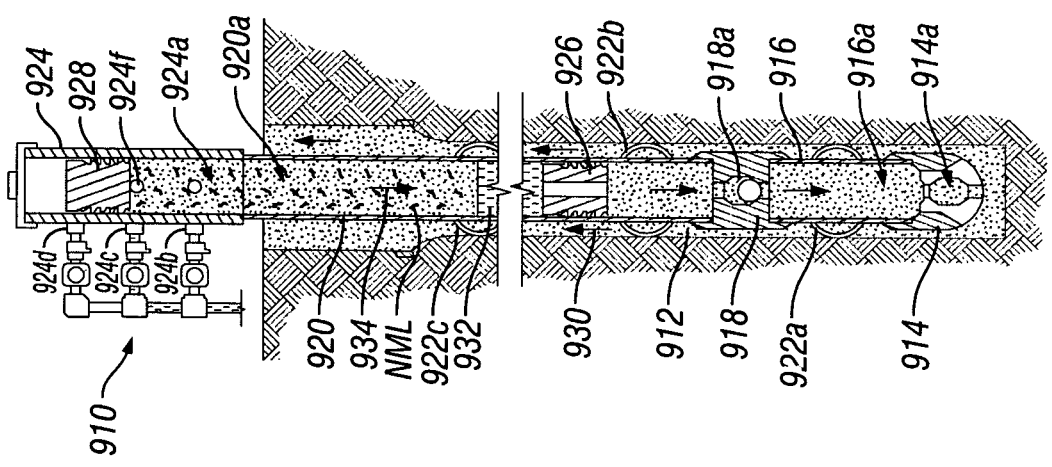
FIG. 9B is a fragmentary cross-sectional illustration of an embodiment of a step in a method according to the present invention after the previous step.
Figure 9A:
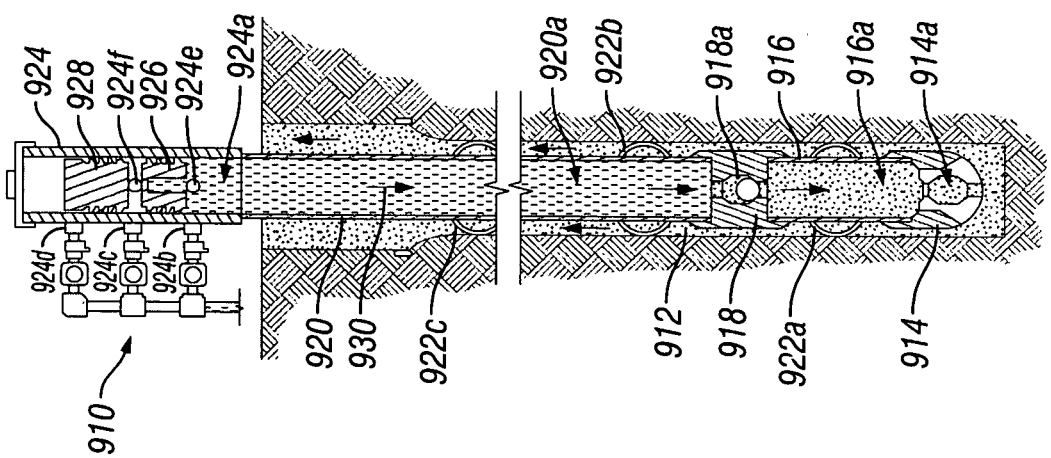
FIG. 9A is a fragmentary cross-sectional illustration of an embodiment of a step in a method according to the present invention.

Referring to FIG. 9A, a method 910 according to the present invention is illustrated for cementing a wellbore 912 which employs a system that includes a shoe 914 defining a passage 914a that is coupled to an end of a tubular member 916 defining a passage 916a. The tubular member 916 includes one or more tubular members threadably coupled end to end. The other end of the tubular member 916 is coupled to an end of a float collar 918 including a float 918a. The other end of the float collar 918 is coupled to an end of a tubular member 920 defining a passage 920a. Centralizers 922a, 922b, and 922c are coupled to the exteriors of the tubular members, 916 and 918. More generally, the system may include any number of centralizers. The other end of the tubular member 920 is coupled to a fluid injection assembly 924 defining a passage 924a and radial passages 924b, 924c, and 924d, and including retaining pins 924e and 924f. The fluid injection head 924 is commonly referred to as a cementing head. A bottom cementing plug 926 and a top cementing plug 928 are retained within the passage 924a of the fluid injection assembly 924 by the retaining pins 924e and 924f. The bottom cementing plug 926 typically includes a longitudinal passage that is sealed off by a frangible diaphragm.

Figure 9E:
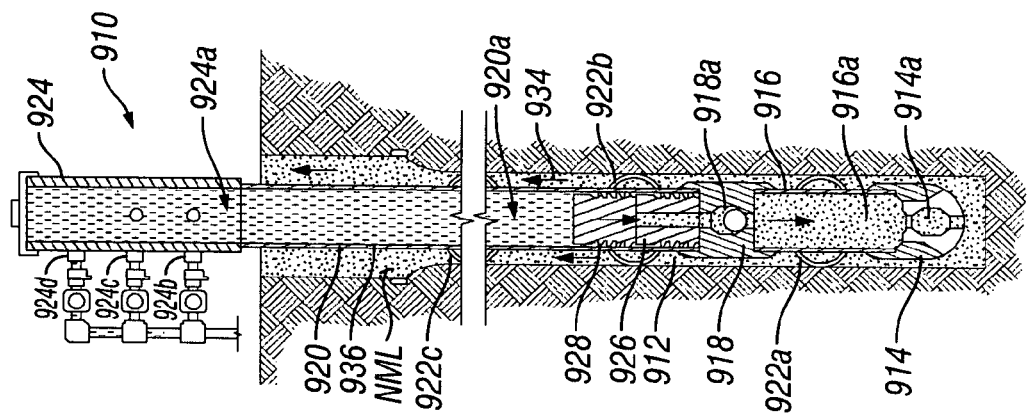
FIG. 9E is a fragmentary cross-sectional illustration of an embodiment of a step in a method according to the present invention after the previous step.
Figure 9D:
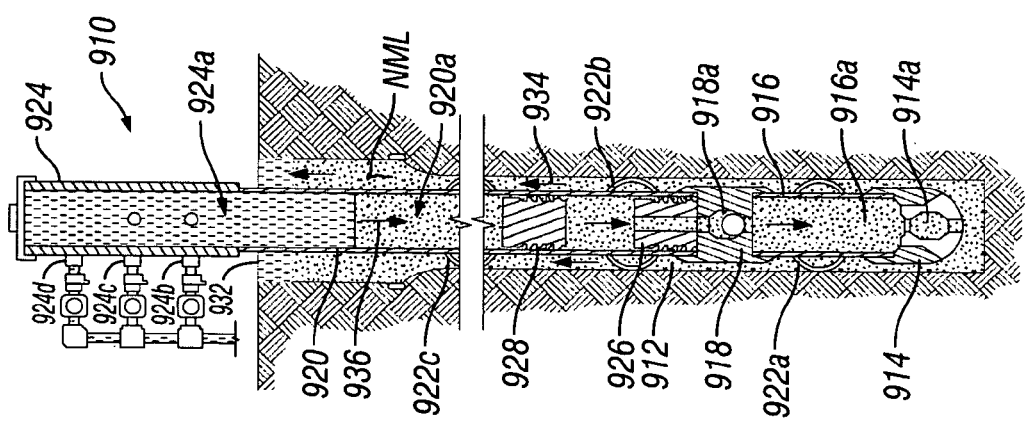
FIG. 9D is a fragmentary cross-sectional illustration of an embodiment of a step in a method according to the present invention after the previous step.

During operation, as illustrated in FIG. 9A, drilling mud 930 is circulated through the wellbore 912 by injecting the drilling mud into the fluid injection assembly 924 through the radial passage 924b. The drilling mud 930 then passes through the passages 924a, 920a, 918a, and 914a into the annulus between the tubular member 920, the float collar 918, the tubular member 916, and the shoe 914. As illustrated in FIG. 9B, the bottom cementing plug 926 is then released and a spacer fluid 932 followed by a cement slurry 934 are injected into the injection assembly 924 through the radial passage 924c behind and above the bottom cementing plug. The cementing slurry 934 contains sufficient electrically nanomaterial NML (not shown to scale) that upon the imposition of an electric current thereon, the nanomaterial NML is resistively heated which in turn heats cement resulting from setting and hardening of the cement slurry 934. As illustrated in FIG. 9C, the top cementing plug 928 is then released and a displacing fluid 936 is injected into the injection assembly 924 through the radial passage 924d behind and above the top cementing plug. As illustrated in FIG. 9D, the continued injection of the displacing fluid 936 displaces the bottom cementing plug 926 into contact with the float collar 918 and breaks the frangible membrane of the bottom cementing plug thereby causing the cement slurry 934 to flow into the annulus between the wellbore 912 and the shoe 914, the tubular member 916, the float collar 918, and the tubular member 920. As illustrated in FIG. 9E, the continued injection of the displacing fluid 936 then displaces the top cementing plug 928 downwardly until the top cementing plug impacts the bottom cementing plug 926. The float element 918a of the float collar 918 prevents back flow of the cement slurry 934 into the tubular member 920. The cement slurry 934 may then be allowed to cure.

A wellbore made as in FIGS. 9A-9E may have any device or system described herein for imposing a current on the nanomaterial in the cement.

Figure 10A:
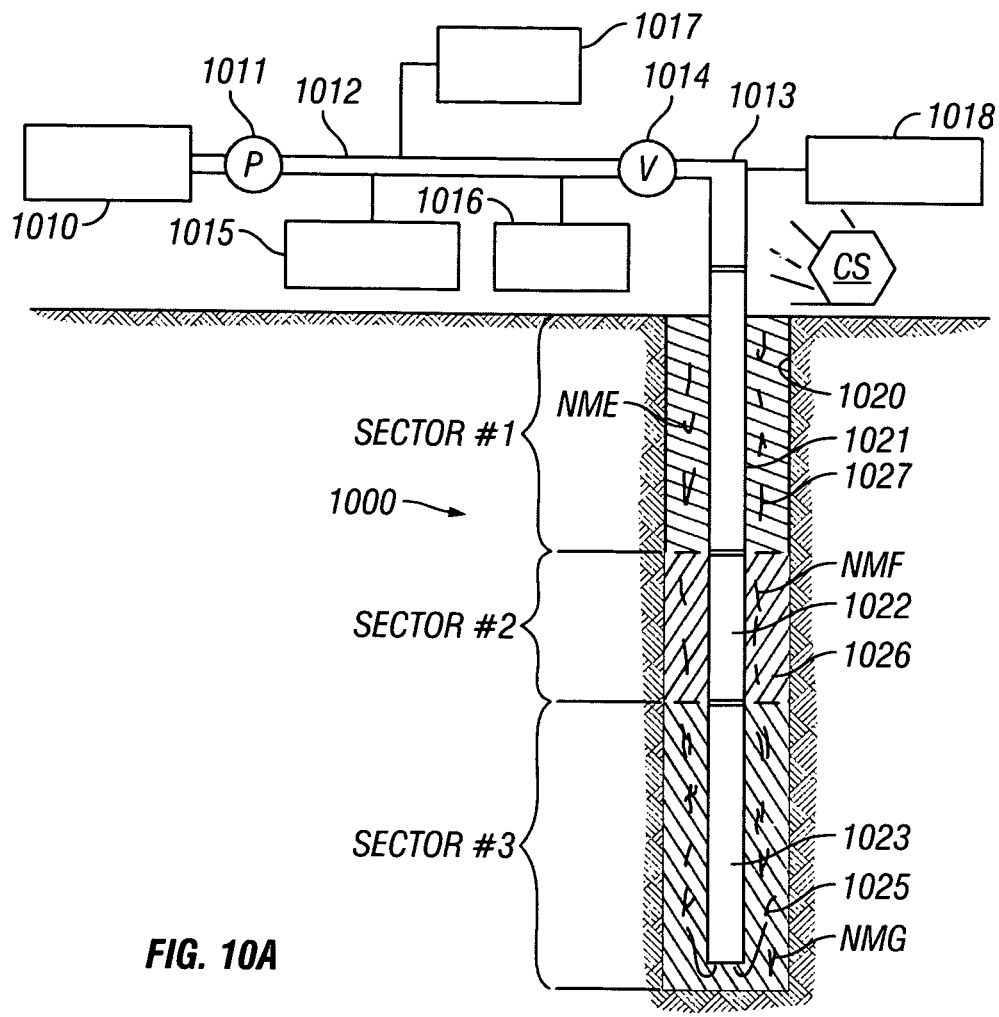
FIG. 10A is a side schematic view of a cementing system connected to a well head with suitable piping for making a cemented wellbore according to the present invention and includes a cement delivery system and well head.

As shown in FIG. 10A, a wellbore 1000 according to the present invention has multiple zones (Sectors 1, 2, 3) with different cements 1027, 1026, 1025, respectively, according to the present invention which can be any cement disclosed herein according to the present invention. Electrically conductive nanomaterial is represented schematically by the material NME, NMF, NMG (may be different materials, similar materials, at the same or at different concentrations; not to scale). The cements can be prepared off site, or, as shown, can be mixed in the field and delivered through pumps 1011 into a manifold 1012. The manifold is connected to a well head at 1013. As appropriate, a suitable valve (or valves) 1014 is interposed between them. The cement is delivered under suitable pressures at selected flow rates. The nature of the cement is variable and the cements 1025-1027 may each be any cement disclosed herein according to the present invention; and they may each be a different cement, any two of them may be the same, or they may all three be the same. It is to be understood that a wellbore according to the present invention may have any multiple number of cement zones, although only three are depicted in FIG. 10A. Optionally, a supply apparatus 1010 may supply different cements and/or other fluids to be used in the cementing process. In certain aspects, two or three different cements and/or fluids may be pumped into the well to complete the cementing job. The manifold 1012 is used to deliver these cements and/or fluids into the well. The pump 1011 is connected with suitable supplies of various fluids for delivery into the well.

At the wellhead, an optional flow meter 1015 measures the rate of flow which can be expressed in barrels per minute. This is the rate of flow of the cement and/or fluid delivered into the well. The density of the fluid can also, optionally, be measured at the wellhead by a transducer 1016. Density may be indicated in pounds per gallon. As appropriate, a fluid analysis device 1017 may be incorporated to make other measurements regarding the cement and/or fluid. Transducers 1015, 1016 and device 1017 form output data which is input town analysis and control system CS which controls the flow of the cement and/or fluid (the control system CS may be any suitable known control system, including, but not limited to, those disclosed in prior patents referred to herein). Any wellbore and method disclosed herein according to the present invention may have one or more of the control systems CS. Pressure at the wellhead may be measured by a device 1018 and may be expressed in pounds per square inch. The pressure device 1018 may be calibrated up to several thousand psi. Pressures in this range are not uncommon.

The wellhead 1013 is connected to a completion string in a wellbore 1020. The wellbore 1020 may, according to the present invention, be cased or open hole, and is represented in a very general form in FIG. 10A. While there may be multiple completion strings, FIG. 10A shows a representative single completion string in the well. This is the string of pipe (or casing) to be cemented in place in the well; this string of pipe can enclose a separate tubing string or strings to conduct produced fluids, e.g. oil and/or gas, to the surface. This string can be uniform from top to bottom, but it can also be made in different sections. To this end, an upper section is identified by the numeral 1021. This section is casing or tubing of a specific diameter and flow characteristic and has a certain length and extends to a selected depth in the bore hole. The number 1022 identifies a second section which is serially connected to a third section 1023. The sections 1021, 1022, and 1023 jointly comprise the completion string. They may be identical and to that degree only a single section need be mentioned. On the other hand, when they are different, they may be different lengths and may be formed of different diameters of casing, tubing, and/or pipe. As an example, the string can taper wherein the top section is relatively large in diameter and the bottom section 1023 is much smaller in diameter. The string terminates at a bottom located opening 1024 which can be fitted with various and sundry known landing nipples supported by packers, bridge plugs and the like; they have been omitted for sake of clarity in the description of the string and the associated equipment.

In general, pipe extends to the bottom or nearly so where cement is delivered from the opening 1024. Cement flows into the annular space and is delivered into the space to complete the cementing job. This space has been represented in very general form in FIG. 10A and will be understood to be that portion of the wellbore where cement is to be delivered, and may, as desired, be defined and isolated by packers or bridge plugs. The annular space may also be temporarily or permanently filled with other fluids either before or after the cement, all for the purpose of completing the cement job and assuring that the cement bond between the string and well bore is completed in the desired fashion. The space is therefore set forth in very general form on the exterior of the string. This fact remains true even should there by multiple tubing strings to multiple zones along the well.

A flow meter 1015 and the other devices and transducers are may be input into the system CS which may include, as needed, a computer or computers and may be accessible on site and/or remotely. Graphic displays may be provided.

Figure 10B:
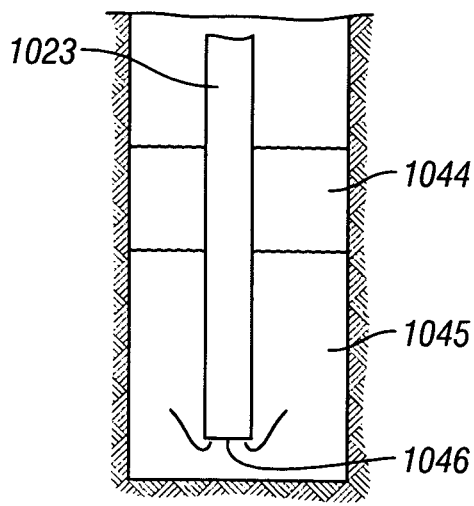
FIG. 10B is a side schematic view of a cemented wellbore according to the present invention showing a casing with cement in an annular space with zones with different cement.

In one aspect, the annular space is filled by cement, cements, and/or fluids which are delivered serially. In one aspect, a first cement is pumped out the opening 1024 at the bottom end of the pipe and is a first cement 1044 which has a measured volume and hence stands to a certain height in the annular space and it is located above a subsequent amount of cement 1045. In one aspect, three cements are pumped into the annular space. As shown in FIG. 10B the cement 1044 has been moved upwardly. The cement 1045 has moved upwardly and it is supported by a third cement 1046 which has introduced therebelow, flowing into the annular space The three cements thus stand one on the other. There may be some interface between them and/or they may flow with a relatively sharp separation.

Figure 10C:
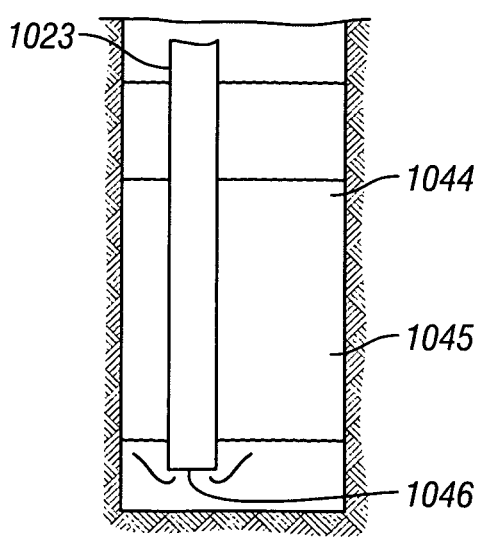
FIG. 10C is a side schematic view of a cemented wellbore according to the present invention showing a casing with cement in an annular space with zones with different cement.

The cements may be isolated by adjacent slugs of other materials which can aid and assist in positioning the cements at the desired locations in the wellbore. This desired location may be delineated by suitable packers and bridge plugs. As is true for any embodiment herein, the cement (or any part thereof) may be heated to facilitate its curing, solidifying, and/or setting A wellbore made as in FIGS. 10A-10C may have any device or system described herein for imposing a current on the nanomaterial in the cement.

Figure 11:
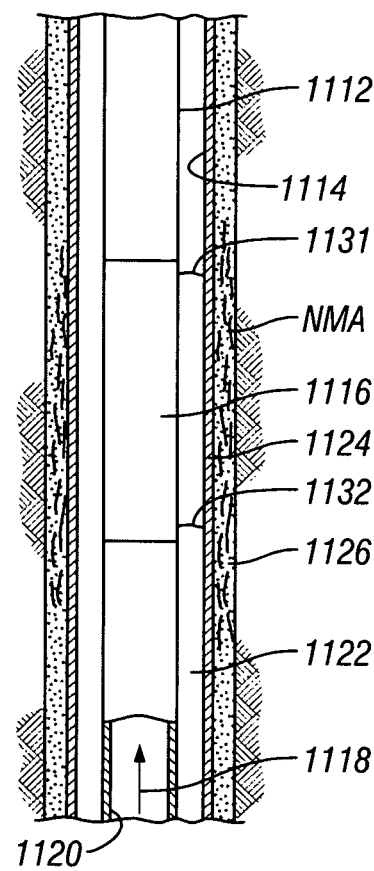
FIG. 11 a side schematic view of a cemented wellbore according to the present invention.

As depicted in FIG. 11, a tubular string 1112 (such as a production, injection, drill, test or coiled tubing string) has been installed in a wellbore 1114 cased with casing 1124 cemented with cement 1126. The cement 1126 may be any cement according to the present invention which has sufficient electrically conducting nanomaterial NMA (not shown to scale) that, upon imposition of electric current thereon, heats the cement, and/or the casing, the interior of the casing, and/or the tubing, the interior of the tubing and/or the earth formation adjacent the casing. An electrical power generator 1116 is interconnected in the tubular string 1112. The generator 1116 generates electrical power from flow of fluid (represented by arrow 1118) through an internal flow passage 1120 of the tubular string 1112. Optionally, the generator 1116 is disposed on an interior wall of the casing.

The fluid 1118 is shown as flowing upwardly through the tubular string 1112 (as if the fluid is being produced), but it should be clearly understood that a particular direction of flow is not necessary in keeping with the principles of the invention. The fluid 1118 could flow downwardly (as if being injected) or in any other direction. Furthermore, the fluid 1118 could flow through other passages (such as an annulus 1122 formed radially between the tubular string 1112 and the wellbore 1114) to generate electricity, if desired.

The generator 1116 is illustrated as being electrically connected with lines 1131 and 1132 to the casing, but it is within the scope of the present invention for any connection, lines, cables, wireless apparatus, etc. disclosed herein to be used to connect the generator 1116 to the casing, or through the casing to the cement.

Figure 12:
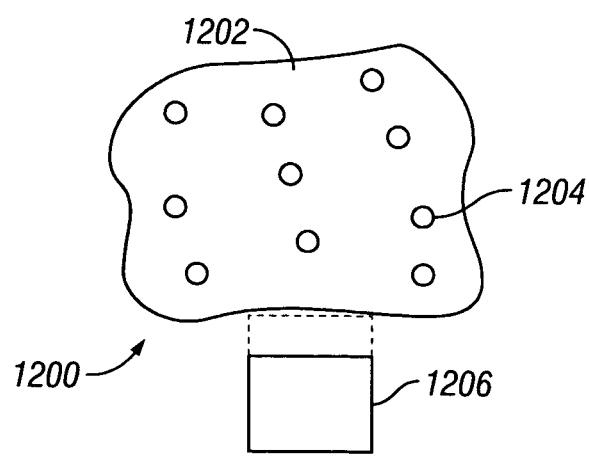
FIG. 12 a schematic view of a system and method according to the present invention. Nanomaterial is not depicted to scale in any drawing.

FIG. 12 illustrates a method 1200 according to the present invention in which material 1202 ("PRIMARY MATERIAL IN OR FOR USE IN A WELLBORE") which has within it material 1204 that is heatable by the application of energy to it ("HEATABLE MATERIAL"). Energy is applied to the heatable material by an energy source 1206 ("ENERGY SOURCE"). The energy source 1206 is, as shown, spaced apart from the material 1202 or (as shown with the dotted lines) the energy source 1206 is in contact with the material 1202.

The material 1202 may be any material used in wellbore operations, including, but not limited to, drilling fluid, fracturing fluid, cement, polymers, composites, epoxy, epoxy systems, and two-part epoxies. The heatable material 1204 may be any known energy heatable material, e.g., but not limited to, microwave heatable material, resistively heatable electrically conductive material, and inductively heatable material heatable by the application of a magnetic field. The heatable material may be nanomaterial. The energy source may be any suitable source of energy, including, but not limited to, apparatus for applying microwaves, magnetic field apparatus such as apparatus with an induction coil, and a power source of electrical current.

In certain aspects of the present invention wellbores according to the present invention and methods according to the present invention employ a power source for imposing an electric current on electrically conductive nanomaterial. It is within the scope of the present invention to use any suitable known power source, battery, generator, capacitor, motor, or storage device for supplying the electrical current, including, but not limited to, those disclosed in U.S. Pat. Nos. 7,242,103; 7,699,102; 7,002,261; 7,133,325; 7,814,993; 7,717,167; 6,717,283; 6,672,409; 6,672,382; 6,554,074; 6,504,258; 6,470,970; 6,424,079; 6,179,052; 6,020,653; 5,995,020; 5,965,964; 5,626,200; 5,202,194; 4,416,000; 4,415,823; 4,215,426; 4,015,234; 3,968,387; and 3,448,305 and in each prior reference cited in each of these patents—all said patents and said references incorporated fully herein for all purposes; and the control systems, communications systems, cabling, wireless transmission apparatus etc. disclosed in these applications and patents, when suitable, may be used with the wellbores and the methods of the present invention.

It is within the scope of the present invention to use one, two, three or greater multiples of any energy source, etc. disclosed herein for a single wellbore, including, but not limited to, those of FIGS. 5A-5D and FIG. 11. It is also to be understood that the wellbore of FIG. 11 may have multiple zones with heatable material, with one or more energy sources. Any energy source used with embodiments according to the present invention that is movable may be selectively moved to any desired point in a wellbore or in a tubular (e.g., casing) to apply energy (electric current, magnetic field, and/or microwaves) at any desired location.

The present invention, therefore, provides in at least certain embodiments methods for cementing casing in a wellbore, the methods in certain aspects including cementing all of or at least a portion of a tubular, e.g., but not limited to, casing in a wellbore with cement that contains electrically conductive nanomaterial.

The present invention, therefore, provides in at least certain embodiments methods for heating cement in a wellbore, the methods in certain aspects including imposing an electrical current on at least a portion of cement, said at least a portion of cement containing electrically conductive nanomaterial that is heated upon the imposition of the electrical current, the cement being any cement used in a wellbore and, in one aspect, cement that cements casing in a wellbore.

The present invention, therefore, provides in at least certain embodiments methods for heating cement in a wellbore, the methods in certain aspects including methods for heating casing cemented in a wellbore with cement, the methods including imposing an electrical current on all of or at least a portion of cement that cements casing in a wellbore, said cement containing electrically conductive nanomaterial that is heated upon the imposition of the electrical current resulting in heating of the nanomaterial, said heating of the nanomaterial causing heating of the casing.

The present invention, therefore, provides in at least certain embodiments methods for heating contents of a tubular in a wellbore, the wellbore including cement therein, the methods in certain aspects including heating the contents within a wellbore (including, but not limited to contents within a tubular within a wellbore, including but not limited to the contents of casing or of tubing within a wellbore, including but not limited to the contents of tubing within casing in a wellbore, the methods including: imposing an electrical current on all of or at least a portion of cement in a wellbore, the wellbore having contents or a tubular within the wellbore having contents, said cement containing electrically conductive nanomaterial heated upon the imposition of the electrical current resulting in heating of the nanomaterial, said heating of the nanomaterial causing heating of the contents in the wellbore or causing heating of the tubular (e.g., tubing or casing), said heating resulting in heating of the contents. In such methods, incertain aspects, the contents is fluid, the fluid being one of drilling fluid, oil, gas, and water.

The present invention, therefore, provides in at least certain embodiments methods for heating earth formation adjacent cement in a wellbore, the cement in the wellbore or the cement around casing in the wellbore, the methods including: imposing an electrical current on all of or on at least a portion of cement that cements casing in a wellbore, said at least a portion of cement containing electrically conductive nanomaterial that is heated upon the imposition of the electrical current; said heating of the electrically conductive nanomaterial causing heating of the cement which in turn heats earth formation adjacent the cement. In certain aspects, such a method in which the earth formation contains fluid to be produced through the wellbore heating the earth formation heats the fluid to be produced.

The present invention, therefore, provides in at least certain embodiments methods for cementing a string of casing disposed in a well bore which includes a float collar connected near the bottom end thereof include the steps of: releasing a first displacement plug into said casing which is selectively openable after landing on said float collar; pumping a first displacement fluid behind said first displacement plug until said first displacement plug is displaced through said casing and lands on said float collar; causing said first displacement plug to open; pumping a cement slurry into said casing in a predetermined quantity required to fill the annulus between the exterior of said casing and the walls of said well bore with said cement slurry, said cement slurry containing electrical conductive nanomaterial which, upon the imposition of an electric current thereto, is resistively heatable; and releasing a top cementing plug into said casing and pumping a second displacement fluid behind said top cementing plug to displace said cement slurry through said casing and through said open displacement plug into said annulus. Such methods may include allowing the cement to set forming solid cement, and imposing an electric current on said electrical conductive nanomaterial to resistively heat the electrically conductive nanomaterial thereby heating the cement and/or imposing an electric current on said electrical conductive nanomaterial to resistively heat the electrically conductive nanomaterial thereby facilitating the setting of the cement.

The present invention, therefore, provides in at least certain embodiments methods for cementing a tubular string in a wellbore, the methods including making a wellbore in the earth, placing a tubular string in the wellbore, introducing cement into a space between an exterior of the tubular string and an interior of the wellbore, the cement containing electrically conductive nanomaterial which is resistively heatable, and allowing the cement to set. In such methods the cement can include amounts of different cements each different cement located generally at a different location in the space, and, optionally, each different cement having a different concentration of electrically conductive nanomaterial.

The present invention, therefore, provides in at least certain embodiments methods for heating cement that is in a wellbore and/or cement cementing casing in a wellbore, the methods including: imposing an electrical current on all of or on at least a portion of the cement, said cement containing sufficient electrically conductive nanomaterial so that the cement is heated upon the imposition of the electrical current, the electrical current supplied by a power source, the electrical current being one of alternating current and direct current, and, optionally, the power source controlled on-site or remotely by a control system. In such a method the power source may be any wired or wireless power source or generator, fixed or movable, and may be controlled by a control system that is one of on-site accessible and remotely accessible.

The present invention, therefore, provides in at least certain embodiments methods for heating cement that is in a wellbore and/or that is cementing casing in a wellbore, the methods including: imposing an electrical current on all of or on at least a portion of cement, said cement containing sufficient electrically conductive nanomaterial that the cement is heated upon the imposition of the electrical current; the electrical current supplied by a power source, the power source being located within earth formation adjacent the casing, within the cement, within the wellbore, at an earth surface, within the wellbore, or within the casing.

The present invention, therefore, provides in at least certain embodiments methods for heating cement that is in a wellbore or that is cementing casing in a wellbore, the methods including: imposing an electrical current on the cement, said cement containing electrically conductive nanomaterial that is heated upon the imposition of the electrical current, the cement including spaced-apart amounts of different cements each different cement located generally at a different location in the wellbore, and heating the different cements at the same time or at different times. Such methods may include one or some, in any possible combination, of the following: the different cements are one on top of the other and the heating is done from top to bottom of cements so that a lowermost cement is heated last or the different cements are one on top of the other and the heating is done from bottom to top of the different cements so that a lowermost cement is heated first; and/or each different cement has a different concentration of electrically conductive nanomaterial.

The present invention, therefore, provides in at least certain embodiments methods for cementing casing in a wellbore, the method including cementing a casing in a wellbore with cement that contains electrically conductive nanomaterial, the cement comprising a plurality of spaced-apart cements each with a different concentration of electrically conductive nanomaterial.

The present invention, therefore, provides wellbores with cement therein, the cement containing heatable electrically conductive nanomaterial. In certain aspects, the wellbore is cased with casing and the cement is heatable to heat the cement and/or to heat the casing an/or to heat things or fluids in contact with or near the heated cement and/or in contact with or near the casing.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. The prior text of this specification is in accordance with the requirements of 35 U.S.C. §112. The inventor may rely on the Doctrine of Equivalents to determine and assess the scope of their invention and of the claims that follow as they may pertain to apparatus and/or methods not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A method comprising
    making a wellbore in the earth,
    placing a tubular string in the wellbore,
    introducing cement into a space between an exterior of the tubular string and an interior of the wellbore, the cement containing heatable material,
    allowing the cement to set,
    facilitating setting of the cement with heat, the heat generated by applying energy to the heatable material thereby heating the heatable material,
    wherein the heatable material is at least one of or a combination of nanotubes, nanographene, nanographene ribbons, transformed nanomaterials, carbon nanomaterials, carbon nanotubes, single-walled nanotubes, multi-walled nanotubes, double walled nanotubes, and surface-modified nanotubes.

2. The method of claim 1 further comprising
    after the cement has set, heating the heatable material to heat the cement.

3. The method of claim 1 wherein the cement is heated by heating the heatable material to heat one of contents of the tubular string and earth through which the tubular string extends, or to heat both the contents and the earth.

4. The method of claim 1 wherein the tubular string is a string of casing disposed in the wellbore with an annulus between an exterior of the casing and an interior of the wellbore, and the casing string includes a float collar, the method further comprising
    releasing a first displacement plug into said casing which is selectively openable after landing on said float collar;
    pumping a first displacement fluid behind said first displacement plug until said first displacement plug is displaced through said casing and lands on said float collar;
    causing said first displacement plug to open;
    pumping the cement into said casing in a predetermined quantity required to fill the annulus with said cement; and
    releasing a top cementing plug into said casing and pumping a second displacement fluid behind said top cementing plug to displace said cement through said casing and through said open displacement plug into said annulus.

5. The method of claim 1 wherein the cement includes spaced-apart amounts of different cements each different cement located generally at a different location, and the method further comprising
    heating the different cements at different times.

6. The method of claim 5 wherein the different cements are one on top of the other and the heating is done in one of a first way and a second way, the first way comprising heating from top to bottom of the cements so that a lowermost cement is heated last and the second way comprising heating from bottom to top of the different cements so that a lowermost cement is heated first.

7. The method of claim 5 wherein each different cement has a different concentration of heatable material.

8. The method of claim 1 wherein the heatable material includes at least one of resistively heatable electrically conductive material, inductively heatable material, and microwave heatable material.

* * * * *